(12) United States Patent
Carrier et al.

(10) Patent No.: US 8,950,281 B2
(45) Date of Patent: Feb. 10, 2015

(54) WORM-GEAR ASSEMBLY HAVING A PIN RACEWAY

(71) Applicant: SpinControl Gearing LLC, Lake Wales, FL (US)

(72) Inventors: Eric D. Carrier, Lake Wales, FL (US); David O. Carrier, Lake Wales, FL (US)

(73) Assignee: SpinControl Gearing LLC, Lake Wales, FL (US)

( * ) Notice: Subject to any disclaimer, the term of this patent is extended or adjusted under 35 U.S.C. 154(b) by 0 days.

(21) Appl. No.: 14/096,489

(22) Filed: Dec. 4, 2013

(65) Prior Publication Data

US 2014/0090502 A1    Apr. 3, 2014

Related U.S. Application Data

(62) Division of application No. 13/661,388, filed on Oct. 26, 2012, now Pat. No. 8,601,894, which is a division of application No. 12/800,593, filed on May 18, 2010, now Pat. No. 8,302,502, which is a division of application No. 11/340,920, filed on Jan. 26, 2006, now abandoned.

(51) Int. Cl.
*F16H 1/16* (2006.01)
*F16H 1/20* (2006.01)
*F16H 1/06* (2006.01)

(52) U.S. Cl.
CPC . *F16H 1/16* (2013.01); *F16H 1/166* (2013.01)
USPC .............................................. 74/415; 74/425

(58) Field of Classification Search
CPC ........... F16H 55/10; F16H 1/24; F16H 1/166; F16H 3/426; F16H 1/222; F16H 1/12; F16H 1/16; F16H 55/22; F16H 57/039; F16H 1/163
USPC ............................................ 74/415, 416, 425
See application file for complete search history.

(56) References Cited

U.S. PATENT DOCUMENTS

| 33,975 A | 12/1861 | Preston |
| 44,681 A | 10/1864 | Wappich |
| 74,337 A | 2/1868 | Gallagher |
| 507,681 A | 10/1893 | Hoyt |
| 598,629 A | 2/1898 | Higgins |

(Continued)

FOREIGN PATENT DOCUMENTS

| AT | 20705 | 7/1905 |
| DE | 155 795 | 10/1904 |

(Continued)

OTHER PUBLICATIONS

Office Action from corresponding Russian Application No. 2008134723111, dated Feb. 18, 2010.

(Continued)

*Primary Examiner* — Justin Krause
(74) *Attorney, Agent, or Firm* — Lerner, David, Littenberg, Krumholz & Mentlik, LLP

(57) ABSTRACT

A worm-gear assembly including a worm screw having at least one groove and a wheel having a plurality of rotatable pins along its periphery for engaging the worm screw. The pins are able to rotate in a direction other than a direction of wheel rotation. At least one raceway is provided for contacting pins that are not engaged with the worm screw during operation of the assembly.

11 Claims, 15 Drawing Sheets

(56) References Cited

U.S. PATENT DOCUMENTS

| | | |
|---|---|---|
| 626,515 A | 6/1899 | Whitney |
| 718,398 A | 1/1903 | Staehle |
| 874,342 A | 12/1907 | Janson |
| 1,060,933 A | 5/1913 | Myers |
| 1,164,847 A | 12/1915 | Neubauer |
| 1,165,974 A | 12/1915 | Ingram |
| 1,449,205 A | 3/1923 | Alton |
| 1,529,932 A | 3/1925 | Smith |
| 1,580,055 A | 4/1926 | Lax |
| 1,754,697 A | 4/1930 | Saglioni |
| 2,278,880 A | 4/1942 | Ivy |
| 2,597,389 A | 5/1952 | Setter |
| 2,714,315 A | 8/1955 | Reader et al. |
| 3,242,755 A | 3/1966 | Kuehnle |
| 3,274,847 A * | 9/1966 | Jones .............................. 74/425 |
| RE26,476 E | 10/1968 | Kuehnle |
| 3,477,305 A | 11/1969 | McCartin |
| 3,490,306 A | 1/1970 | Haensgen et al. |
| 3,597,990 A | 8/1971 | McCartin |
| 3,648,535 A | 3/1972 | Maroth |
| 3,820,413 A | 6/1974 | Brackett |
| 3,875,817 A | 4/1975 | Mayfield |
| 4,297,919 A | 11/1981 | Kuehnle |
| 4,541,297 A | 9/1985 | Fujita |
| 4,588,337 A | 5/1986 | Brackett |
| 4,651,586 A | 3/1987 | Nemoto |
| 4,665,763 A | 5/1987 | James |
| 4,685,346 A | 8/1987 | Brackett |
| 4,781,656 A | 11/1988 | Brackett et al. |
| 4,782,716 A | 11/1988 | F'Geppert |
| 4,813,292 A | 3/1989 | Boyko |
| 4,833,934 A | 5/1989 | Boyko et al. |
| 5,330,037 A | 7/1994 | Wang |
| 5,339,934 A | 8/1994 | Liang |
| 5,394,965 A | 3/1995 | Kho |
| 5,547,053 A | 8/1996 | Liang |
| 5,615,757 A | 4/1997 | Chen |
| 5,690,196 A | 11/1997 | Wang |
| 5,784,923 A | 7/1998 | Kuehnle |
| 5,901,611 A | 5/1999 | Brackett |
| 6,547,441 B2 | 4/2003 | Kato |
| 2002/0048420 A1 | 4/2002 | Kato |
| 2003/0121715 A1 | 7/2003 | Palakodati et al. |
| 2004/0147362 A1 | 7/2004 | Kuehnle |
| 2004/0163879 A1 | 8/2004 | Segawa |

FOREIGN PATENT DOCUMENTS

| | | |
|---|---|---|
| DE | 212725 | 8/1909 |
| JP | 38-20765 | 10/1963 |
| JP | 61256044 A | 11/1986 |
| RU | 37786 U1 | 5/2004 |
| RU | 77312 U1 | 10/2008 |
| WO | 96/12901 | 5/1996 |
| WO | 01/27495 | 4/2001 |

OTHER PUBLICATIONS

Office Action from corresponding Russian Application No. 2008134723/11, dated Sep. 6, 2010.

Japanese Office Action fo Application No. 2008-552364 dated May 15, 2012.

Japanese Office Action for Application No. 2013-007406 dated Nov. 12, 2013.

* cited by examiner

WORM-GEAR ASSEMBLY HAVING A PIN RACEWAY

CROSS-REFERENCE TO RELATED APPLICATIONS

This application is a divisional of U.S. application Ser. No. 13/661,388, filed on Oct. 26, 2012, which is a divisional of U.S. application Ser. No. 12/800,593, filed on May 18, 2010, which is a divisional of U.S. application Ser. No. 11/340,920, filed on Jan. 26, 2006, the disclosures of which are incorporated herein by reference.

FIELD OF THE INVENTION

The present invention relates to worm-gear assemblies, and more particularly, to worm-gear assemblies in which a worm screw is engaged by pins on the periphery of a wheel.

BACKGROUND OF THE INVENTION

An important consideration in the design of gear systems is the minimization of friction between gear components. By minimizing friction between gear components, the efficiency of a gear system is increased. For example, in a gear system that is used for the transmission of power, transmission loss due to friction within the system is reduced when friction within the system is reduced. Further, by minimizing friction between gear components, the longevity of a gear system is increased. That is, by reducing inter-component friction in the gear system the rate of frictional wear on the components is reduced, thereby increasing the amount of time the system can be operated before it fails.

A common gear system of the prior art includes two or more gears having a circular body. Each gear includes a plurality of "teeth" along the periphery of its circular body. The teeth of the two gears intermesh such that force can be transmitted from one of the gears to the other through the intermeshing teeth. Thus, if a torque is applied to one of the gears causing the gear to rotate, the gear's teeth will exert a force on the teeth of the other gear, causing the other gear to rotate. The sliding of the respective sets of teeth against each other is a source of gear system friction.

One way in which designers have reduced friction between components of a gear system is by substituting rotatable pins for gear teeth. FIG. 1 is an isometric view of a prior gear system in which rotatable pins have been used in lieu of teeth. As can be seen from the figure, a multiple of rotatable pins 5 are positioned along the periphery of a wheel 10 and engage a worm screw 15. The pins are arranged in a single "row" along the circumference of the wheel. The worm screw has an hourglass shape and has a spiral grove 20 cut into its surface. The pins engage the worm screw by moving through the spiral groove.

The gear system of FIG. 1 is typically used to transmit power from a drive shaft 25 to an axel 30. More specifically, as a torque is applied to shaft 25 in the direction shown by arrow 35, the groove exerts a force on the pins it engages, causing the wheel to rotate in the direction shown by arrow 40. Bearings 45a and 45b support the wheel while allowing it to rotate.

As the pins 5 rotate through the groove they are free to turn about their longitudinal axes by virtue of bearings 50. For example, as pin 7 moves through the groove it rotates in the direction shown by arrow 55. Since the pins are free to rotate about their longitudinal axes, the friction between the pins and the walls of the groove is reduced. That is, since the pins can rotate about their longitudinal axes they can rotate about the walls of the groove. Whereas, if the pins could not rotate about their longitudinal axes they would have to slide against the walls of the groove.

While the gear system of FIG. 1 realizes the advantage of substituting rotatable pins for fixed teeth, it has several drawbacks. Three of the problems associated with the system of FIG. 1 are referred to as "pin slip," "skid starting" and "wheel misalignment."

The problem of "pin slip" is caused by the centrifugal force acting on pins 5 as wheel 10 rotates. FIG. 2 is a plan view in profile of some of the elements of the gear system of FIG. 1. In particular, FIG. 2 shows pins 5, bearings 50 and worm screw 15. Also shown are spiral groove 20, drive shaft 25 and a plurality of internal bearings 60. The internal bearings are internal to wheel 10 and help support the pins.

As can be seen from FIG. 2, rotation of the worm screw in the direction shown by arrow 65 causes movement of the pins 5 in the rotary direction shown by arrows 70. Such movement gives rise to a centrifugal force on the pins which is illustrated by arrows 75. The centrifugal force urges the pins radially outward from the center of the wheel, and if the pins are not protected against outward radial movement, the force moves the pins radially outward. It is the radially outward movement of the pins due to centrifugal force that is referred to as "pin slip".

FIG. 3A illustrates the effect of pin slip. The figure shows a slipped pin entering the spiral groove of the worm screw. As can be seen from FIG. 3A, the pin does not enter spiral groove 20 smoothly. Indeed, as the pin moves into position to enter the groove, it could strike the base of the groove. The harsh entrance of the pin into the groove, and any attendant roughness in the remainder of the pin's travel through the groove, reduces the gear system's efficiency and increases the rate of wear and tear.

FIG. 3B is provided as a contrast to FIG. 3A. FIG. 3B shows how a pin that has not slipped enters the spiral groove of the worm screw.

The problem of "skid starting" is explained with reference to FIG. 1. Skid starting is related to the initiation of the rotation shown by arrow 55. More specifically, as pin 7 exits spiral groove 20 there is no force on the pin to maintain its rotation about its longitudinal axis, thus the rotation of the pin will decrease or stop during the time that it is not within the spiral groove. Thus, as the pin travels about the center of wheel 10 and once again enters groove 20, the groove exerts a torque about the pin's longitudinal axis. The torque is exerted on the pin by the wall of the groove (see e.g. FIG. 3B). The initiation of torque between the groove wall and the pin causes the pin to skid rather than roll into the groove, resulting in a roughness in the system's operation, which decreases efficiency and longevity.

The problem of "wheel misalignment" is explained with reference to FIG. 1. Referring to FIG. 1, rotation of the worm screw in the direction of arrow 35 applies a force on pins 5 in the direction shown by arrow 80. More specifically, during rotation of the worm screw in direction 35, the force exerted on pins 5 by groove 20 can be described as including two components, a first component which urges the pins to move in the direction shown by arrow 40 and a second component which urges the pins to move in the direction of arrow 80. Both of the component forces are transmitted to wheel 10, the first component urging the wheel to turn in direction 40 and the second component urging the top of the wheel to move in direction 80. Any movement of the wheel in direction 80 is a source of wheel misalignment. That is, any movement of the wheel in the direction 80 changes the path of the pins relative to the worm screw. The change in path takes the pins off of their intended path and gives rise to roughness and/or inefficiency of operation.

It is important to note that in FIG. 1 it is typical for the forces associated with arrow 80 to exert force on the top of the wheel so as to urge the top of the wheel to move in the direction of arrow 80. But for the fixed center axis of the wheel, this force would cause the bottom of the wheel to move in the opposite direction, as shown by arrow 85. In actual operation of the gear system over extended periods at high velocities, the force at the top of the wheel tends to exceed the restraint of the wheel axis; thereby causing the wheel axis to become deflected, which results in wheel misalignment. For example, if in normal operation the wheel's axis is aligned with the horizontal direction in FIG. 1, wheel misalignment could deflect the axis so that there is some angle between the axis and the horizontal direction.

It is submitted that the dynamic instabilities of pin slip, skid starting, and wheel misalignment have frustrated prior attempts to successfully commercialize rotatable pin type worm-gear assemblies.

SUMMARY OF THE INVENTION

The present invention was conceived to overcome the foregoing problems.

A worm-gear assembly according to the present invention includes a worm screw having at least one groove and a wheel having a plurality of rotatable pins along its periphery for engaging the worm screw. The pins are able to rotate in a direction other than a direction of wheel rotation. At least one raceway is provided for contacting pins that are not engaged with the worm screw during operation of the assembly.

By including a raceway for contacting rotatable pins that are not engaged with the worm screw, the invention realizes many advantages over prior worm-gear assemblies. By eliminating or substantially reducing the problems associated with pin slip, skid starting and wheel misalignment, the invention makes possible a rotatable pin type worm-gear assembly capable of smooth operation over a complete performance range, with substantially less wear and tear, greater efficiency, and greater useful life.

BRIEF DESCRIPTIONS OF THE DRAWINGS

The following detailed description, given by way of example, but not intended to limit the invention solely to the specific embodiments described, may best be understood in conjunction with the accompanying drawings wherein like reference numerals denote like elements and parts, in which.

DETAILED DESCRIPTION

Figure 4:
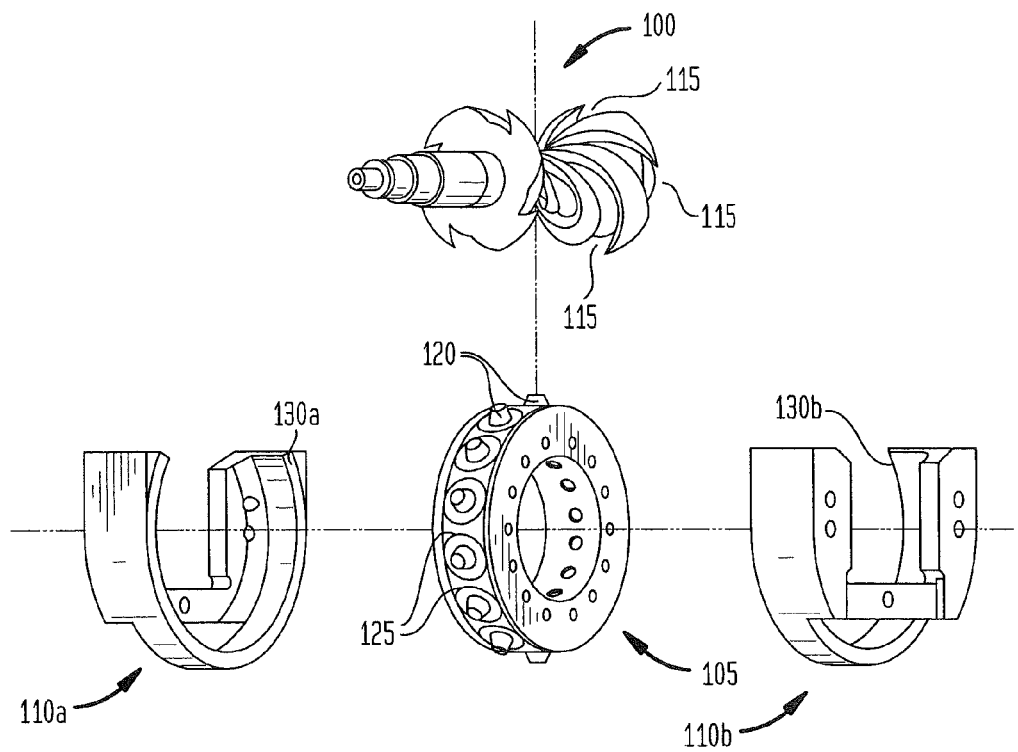
FIG. 4 is an exploded view of a gear system in accordance with a first embodiment of the present invention.

FIG. 4 is an exploded view of a gear system in accordance with a first embodiment of the present invention. The gear system includes a worm screw 100, a worm wheel 105 and two raceways 110a and 110b. The worm screw has an hourglass shape and has a multiple of spiral grooves 115 cut into its surface. The wheel includes a multiple of rotatable pins 120 positioned along its circumference. The pins are arranged in a single "row" along the circumference of the wheel and engage the worm screw by moving through the spiral grooves.

Figure 1:
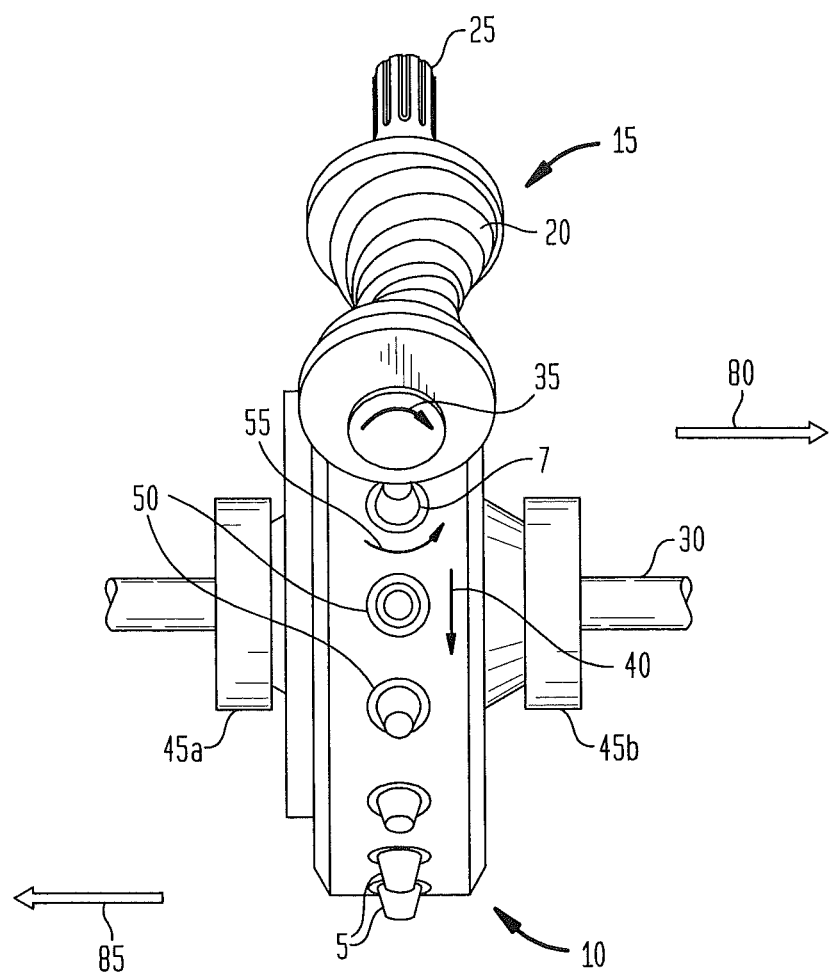
FIG. 1 is an isometric view of a prior gear system in which rotatable pins have been used in lieu of teeth.
Figure 2:
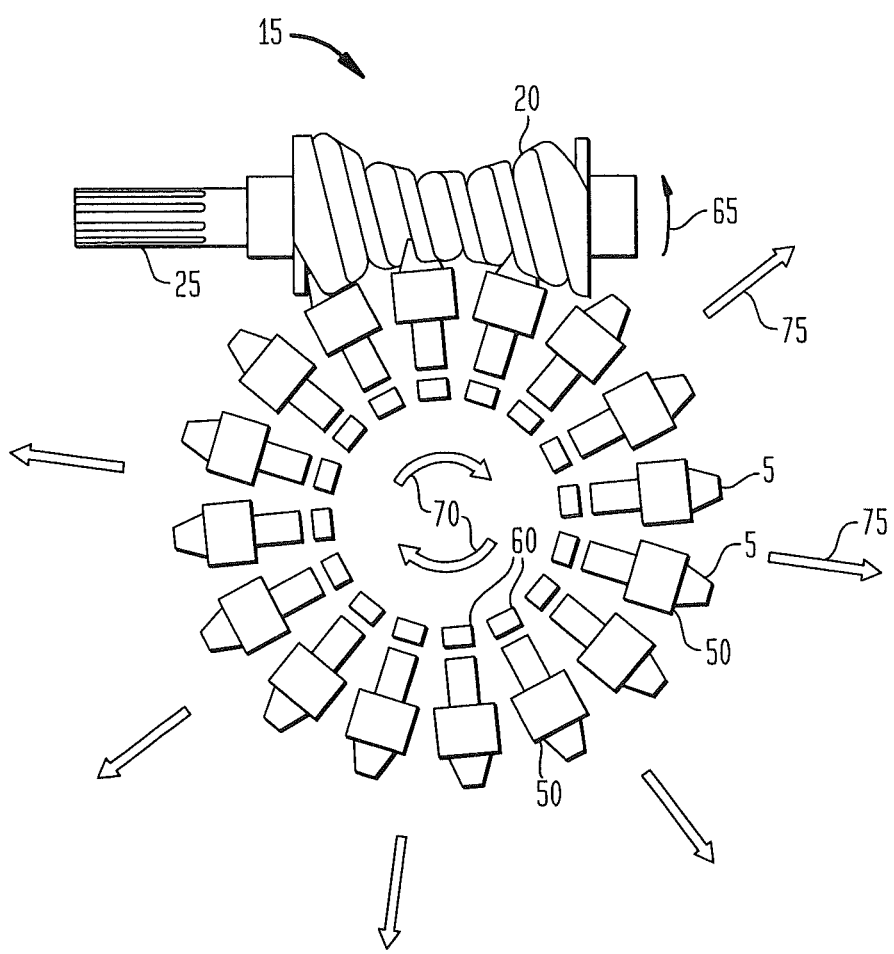
FIG. 2 is a plan view in profile of some of the elements of the gear system of FIG. 1.
Figure 3A:
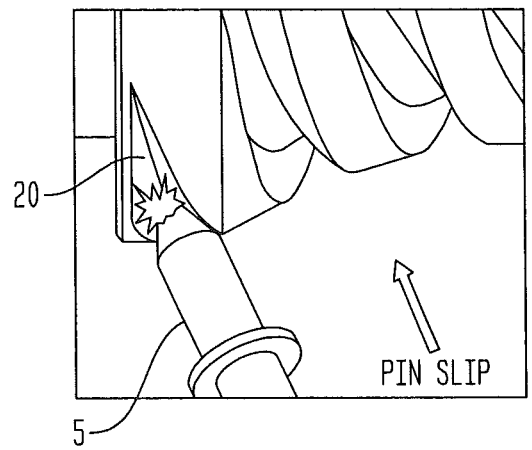
FIG. 3A illustrates the effect of pin slip.
Figure 3B:
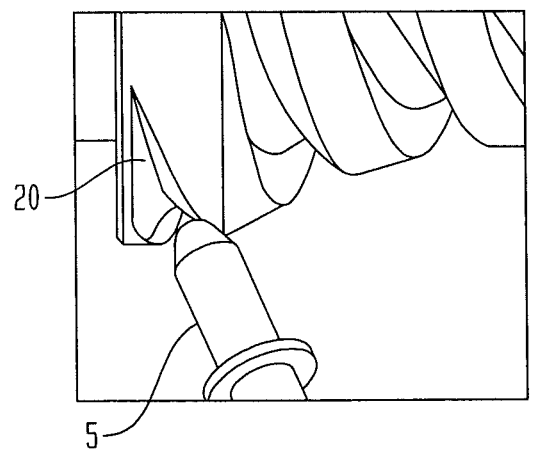
FIG. 3B shows how a pin that has not slipped enters the spiral groove of the worm screw.

As the pins 120 rotate through the grooves they are free to turn about their longitudinal axes in a manner similar to that described in connection with the FIG. 1 system. In particular, the use of bearings 125 allows the pins to rotate about their longitudinal axes. Since the pins are free to rotate about their longitudinal axes, the friction between the pins and the walls of the grooves is reduced. That is, since the pins can rotate about their longitudinal axes they can rotate about the walls of the grooves. Whereas, if the pins could not rotate about their longitudinal axes they would have to slide against the walls of the grooves.

The raceways 110a and 110b of FIG. 4 include raceway bearing surfaces 130a and 130b. In the figure, surface 130a is clearly visible while surface 130b is obscured. As the worm wheel of FIG. 4 turns, one of the raceways contacts those of pins 120 that are not engaged with the worm screw. That is, as the worm wheel turns one of the raceway surfaces 130a or 130b contacts those of pins 120 that are not engaged with grooves 115. It is preferable that the raceway contacts all of the pins that are not engaged with the worm screw. However, the raceway may contact fewer than all pins that are not engaged with the worm screw. Whether the worm wheel is turning or stationary, either raceway may contact all of the pins that are not engaged with the worm screw, fewer than all pins that are not engaged with the worm screw, or none of the pins.

Figure 5:
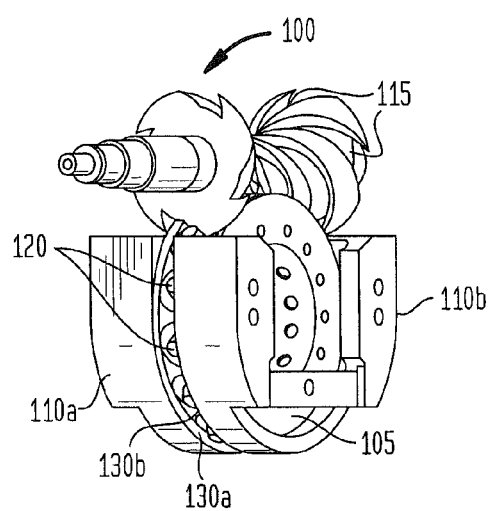
FIG. 5 is an isometric view of the gear system of FIG. 4 in assembled form.

FIG. 5 is an isometric view of the gear system of FIG. 4 in assembled form. As can be seen from FIG. 5, the raceways are positioned at opposite sides of the worm wheel so as to readily engage those of pins 120 that are not engaged by grooves 115.

Figure 6:
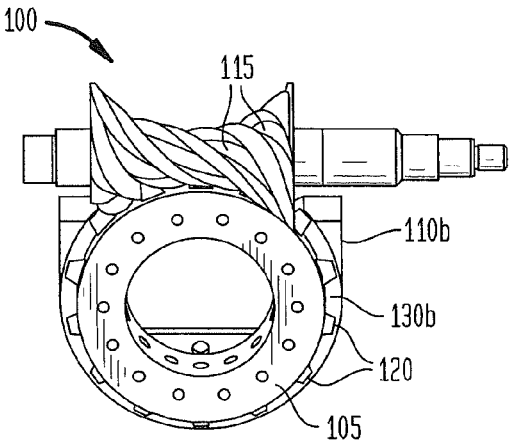
FIG. 6 is a profile view of the assembled gear system depicted in FIG. 5 with one of the raceways removed for purposes of illustration.

FIG. 6 is a profile view of the assembled gear system depicted in FIG. 5 with one of the raceways removed for purposes of illustration. In particular, raceway 110a is not shown in FIG. 6 such that raceway 110b and raceway surface 130b are clearly visible. The relative positioning of pins 120 and raceway surface 130b is also clearly visible.

Figure 7:
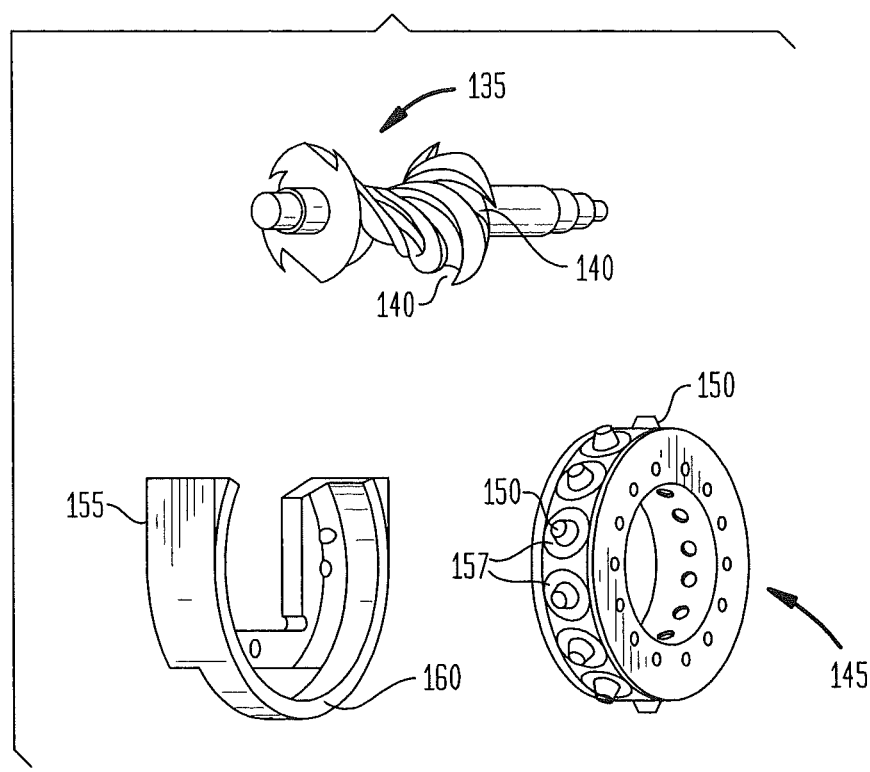
FIG. 7 is an exploded view of a gear system in accordance with a second embodiment of the present invention.

FIG. 7 is an exploded view of a gear system in accordance with a second embodiment of the present invention. The FIG. 7 embodiment is similar to the FIG. 4 embodiment with the exception that raceway 110b and raceway bearing surface 130b are not included in the FIG. 7 embodiment. Thus, the FIG. 7 embodiment includes a worm screw 135, a worm wheel 145 and raceway 155. The worm screw has an hourglass shape and has a multiple of spiral grooves 140 formed in its surface. The wheel includes a multiple of rotatable pins 150 that are positioned along the wheel's circumference. The pins are arranged in a single "row" along the circumference of the wheel and engage the worm screw by moving through the spiral grooves. The raceway includes a raceway bearing surface 160. As the worm wheel turns, the raceway contacts those of pins 150 that are not engaged with the worm screw. That is, as the worm wheel turns the raceway bearing surface contacts those of pins 150 that are not engaged with grooves 140. Preferably the raceway contacts all of the pins that are not engaged with the worm screw. However, the raceway may contact fewer than all of the pins that are not engaged with the worm screw. Whether the worm wheel is turning or stationary, the raceway may contact all of the pins that are not engaged with the worm screw, fewer than all pins that are not engaged with the worm screw, or none of the pins.

Figure 8:
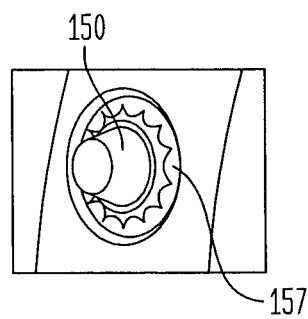
FIG. 8 is a detail view of a rotating pin portion of the first and second embodiments.

FIG. 8 is a detail view of a rotating pin portion of the first and second embodiments. The pins can be rotatable in exclusively the counter-clockwise direction, rotatable in exclusively the clockwise direction, or rotatable in both the clockwise and counter-clockwise directions. As can be seen from FIGS. 7 and 8, the pins are rotatably supported in wheel 145 by bearings 157.

Having described two preferred embodiments of the invention, the functioning of the inventive raceways in those two embodiments will now be described in more detail.

When the gear systems of FIGS. 4-8 are in operation the raceways function to alleviate the problems of pin slip, skid starting and wheel misalignment. More specifically, as the rotation of the worm screw causes the wheel to rotate about its axis, those pins which are not engaged with the worm screw and in contact with a raceway are acted on by the raceway in a manner that keeps them rotating about their longitudinal axes, counters the centrifugal force of the rotating wheel, and counters the worm screw force that urges the wheel toward misalignment (the "misalignment force").

Figure 9:
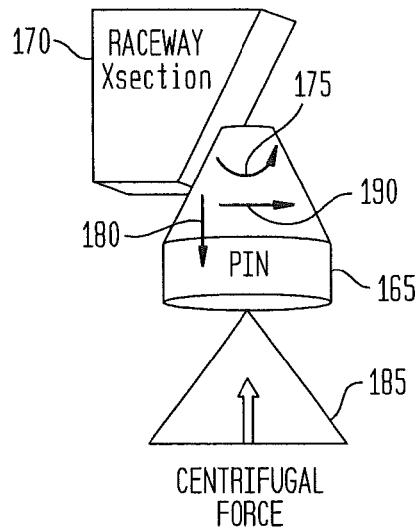
FIG. 9 is a detailed view of how a rotatable pin interfaces with a raceway in accordance with the invention.

For purposes of describing how the raceway and pins interact, reference is made to FIG. 9. FIG. 9 is a detailed view of how a rotatable pin 165 interfaces with a raceway section 170. The figure is applicable to raceways 110a, 110b and 155, and to raceway bearing surfaces 130a, 130b and 160. As can be seen from FIG. 9, as the wheel on which pin 165 is mounted rotates in a direction that carries the pin "into" the page, the contact between pin 165 and the raceway imparts a counter-clockwise torque to the pin (represented by arrow 175). Torque 175 keeps the pin rotating about its longitudinal axis when it is not in contact with the worm screw, such that the pin is already rotating about its longitudinal axis when it contacts the worm screw and the pin does not skid start. Further, the raceway imparts a downward force (represented by arrow 180) countering the centrifugal force due to wheel rotation (represented by arrow 185). Still further, the raceway imparts a left-to-right force (represented by arrow 190) countering the misalignment force.

Figure 10:
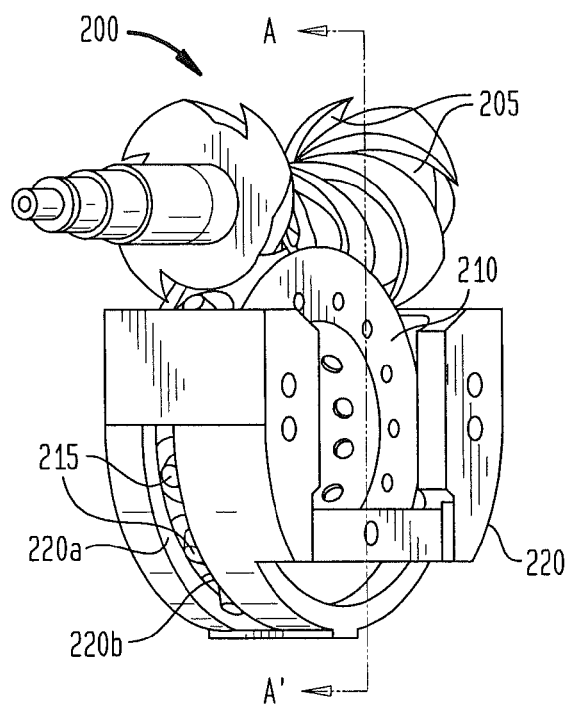
FIG. 10 is an isometric view of a gear system in accordance with a third embodiment of the invention.

FIG. 10 is an isometric view of a gear system in accordance with a third embodiment of the invention. The system includes a worm screw 200 having spiral grooves 205, a worm wheel 210 including rotatable pins 215, and a raceway 220. The raceway 220 is a one-piece component having two raceway bearing surfaces 220a and 220b formed within its inner surface.

Figure 11:
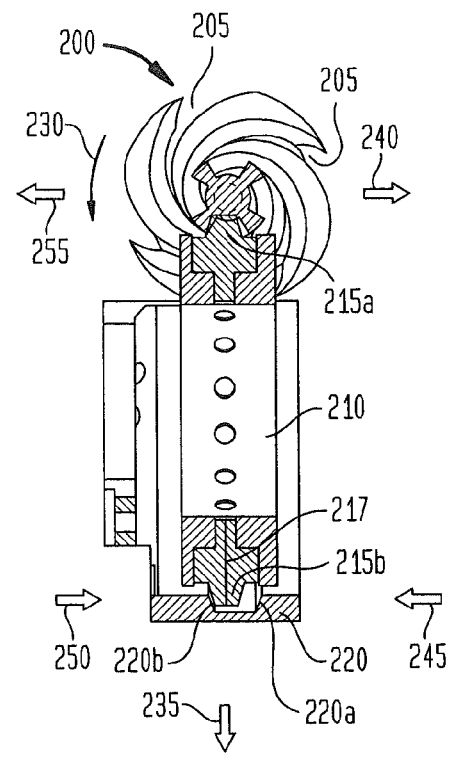
FIG. 11 is a cross-sectional view of the gear system of FIG. 10.

FIG. 11 a cross-sectional view of the gear system of FIG. 10. The cross-section has been taken along line AA' of FIG. 10 and the FIG. 11 view is that seen when looking in the direction of the arrows shown in FIG. 10.

Figure 12:
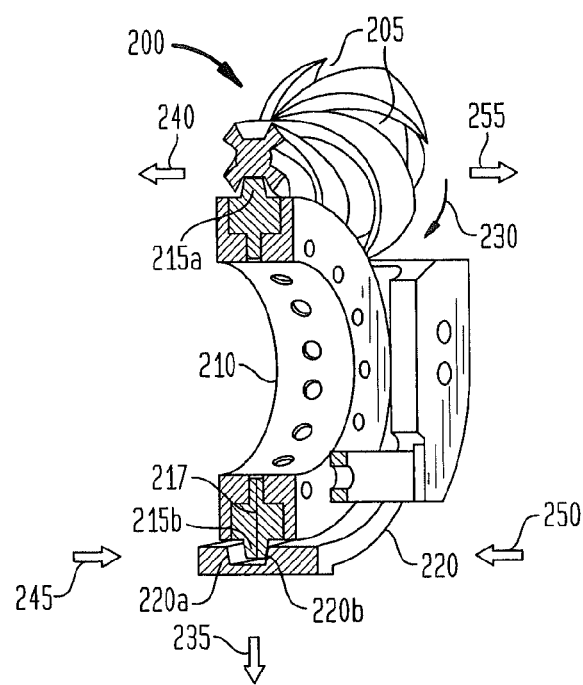
FIG. 12 is an isometric cross-sectional view of the gear system of FIG. 10.

FIG. 12 is an isometric cross-sectional view of the gear system of FIG. 10. The cross-section has been taken along line AA' of FIG. 10 and the view is that looking opposite the direction of the arrows of FIG. 10.

Referring to FIG. 11, as worm screw 200 turns in the direction indicated by arrow 230, a pin 215a is urged in a direction "into" the page as a pin 215b is urged in a direction "outward" from the page. Further, pin 215b is in contact with bearing surface 220b. The contact between pin 215b and surface 220b causes the pin to rotate about its longitudinal axis (represented by line 217) as it moves outward from the page. In this manner, the raceway maintains rotation of the pin about the pin's longitudinal axis as the pin exits the spiral groove of the worm screw. Thus, at the time that the wheel's rotation causes the pin to re-enter the groove, the pin is rotating about its longitudinal axis in a manner complimentary to the longitudinal-axis-rotation that the pin experiences when in contact with the groove. Thus, when the pin enters the groove, the pin does not skid start.

Also, since the portion of the pin that extends from the periphery of the wheel and contacts surface 220b (i.e. the "pin head") has a frustum shape, and surface 220b contacts the lateral surface of the frustum, surface 220b applies a force to the pin in counter-action to the centrifugal force (represented by arrow 235).

Further, as the screw turns the groove in which pin 215a sits a force (shown by arrow 240) is caused that urges pin 215a toward the right of the page. The screw force on pin 215a gives rise to a reaction force (shown by arrow 245) which urges pin 215b to the left. However, since pin 215b is in contact with raceway bearing surface 220b, surface 220b applies a force (shown by arrow 250) in reaction to force 245. Moreover, force 250 gives rise to a reaction force (shown by arrow 255). Thus, the screw force that urges the pins out of alignment (force 240) is resisted by a reaction force (force 255) caused by the raceway.

The dynamics illustrated in FIG. 11 are mirrored in FIG. 12.

It should be noted that while FIGS. 11 and 12 were described in the context of the worm screw rotating in the direction indicated by arrow 230, the invention is equally applicable to rotation of the worm screw in the opposite direction. In this regard, if the worm screw is rotating in the direction opposite direction 230, pin 215b is urged against raceway bearing surface 220a, either by the "misalignment force" that the screw imparts to the wheel, or by some shifting mechanism. Once pin 215b contacts surface 220a, the misalignment force caused by rotation of the worm screw in a direction opposite direction 230 is countered by a force transmitted through surface 220a.

It should be further noted that a gear system according to the invention could be employed in a vehicle drive system such that one direction of rotation of the worm screw corresponds to the "forward" vehicle direction and the other direction of rotation of the worm screw corresponds to the "reverse" vehicle direction. In such an application, the gear system is preferably employed along with a shifting mechanism, the shifting mechanism being used to urge pins against a first raceway bearing surface when the rotation of the worm screw corresponds to the "forward" vehicle direction and to urge pins against a second raceway bearing surface when rotation of the worm screw corresponds to the "reverse" vehicle direction.

Figure 12A:
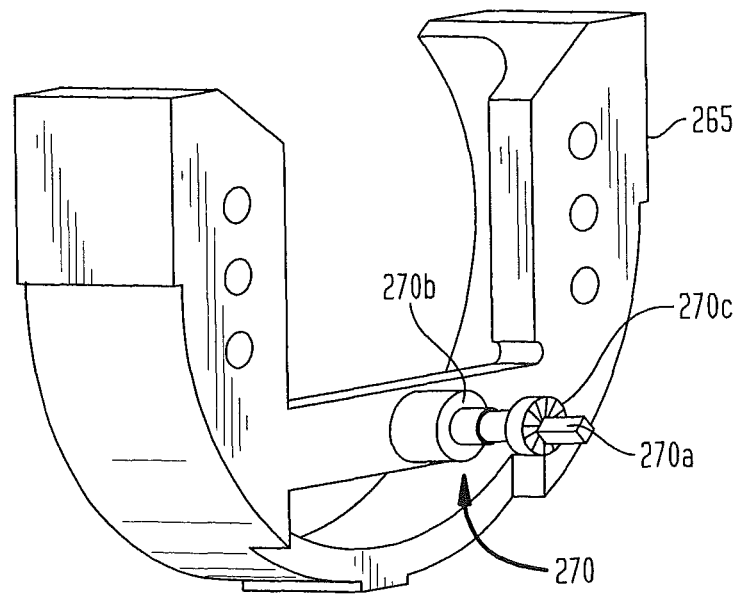
FIG. 12A shows a raceway interfacing with a mechanical shifting mechanism.

An illustrative shifting mechanism is shown in FIG. 12A. The shifting mechanism shown in FIG. 12A is a mechanical shifting mechanism. However, the invention is not limited to mechanical shifting mechanisms. Upon review of FIG. 12A and its description, one skilled in the art of the invention will readily appreciate the wide range of shifting mechanisms that can be employed to shift opposing raceway surfaces to contact opposing sides of the pins on opposite sides of the wheel in the context of a drive system having "forward" and "reverse" directions. For example, suitable shifting mechanisms include electric motor powered rotating threaded shafts, hydraulic actuators, electric solenoids, and hand operated shifting mechanisms and levers.

It should be still further noted that the invention is not limited to the case of the worm screw driving the worm wheel. Rather, the worm wheel could drive the worm screw such that a rotational torque applied to the worm wheel moves the rotatable pins through the groove(s) in the worm screw, and thereby causes the worm screw to rotate.

Figure 14:
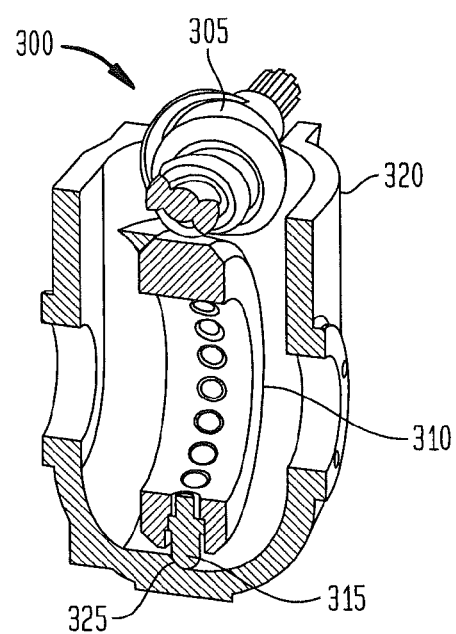
FIG. 14 is an isometric cross-sectional view of the gear system depicted in FIG. 13.

In addition, it is noted that the invention is not limited to raceway bearing surfaces of any particular geometry. Thus, the invention is not limited to raceway bearing surfaces having a planar cross-section as shown in FIG. 9, or a concave cross-section as shown in FIG. 14. Indeed, upon viewing this disclosure one skilled in the art of the invention will readily appreciate the wide range of suitable raceway geometries.

Moreover, it is noted that the worm screw of the present invention is not limited to an hourglass shape. For example, the worm screw could have a cylindrical shape. Upon viewing this disclosure one skilled in the art of the invention will readily appreciate the wide range of suitable worm screw geometries.

Also, the groove or grooves formed in the worm screw are not limited to a spiral form. While spiral grooves are preferred, a wide range of groove configurations are suitable for use with the invention. Upon viewing this disclosure one skilled in the art of the invention will readily appreciate the wide range of suitable groove forms.

Referring back to FIG. 12A, the shifting mechanism embodiments of the invention will now be discussed in more detail.

Figure 12B:
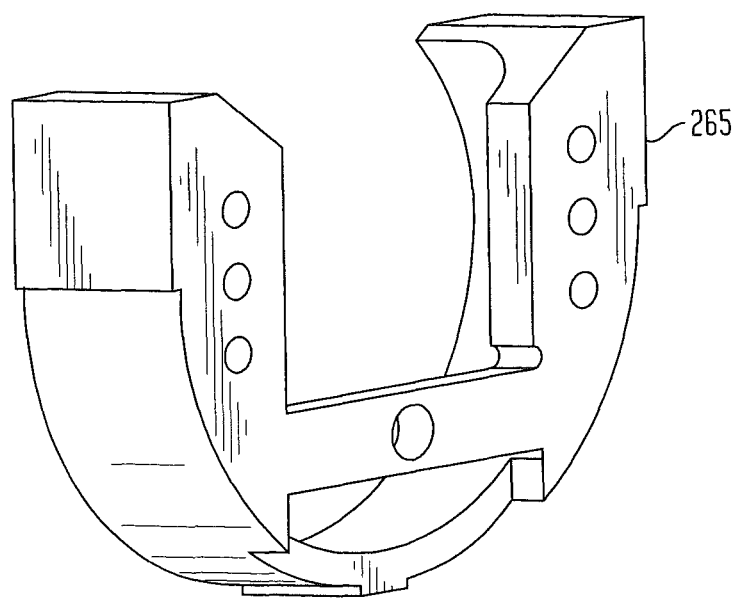
FIG. 12B shows the raceway of FIG. 12A apart from the shifting mechanism.

FIG. 12A shows a raceway 265 of the invention interfacing with a mechanical shifting mechanism 270. The shifting mechanism is used to position the raceway relative to rotatable pins of a worm wheel. FIG. 12B is provided for comparison purposes, and it shows the raceway of FIG. 12A apart from the shifting mechanism. As can be seen from FIG. 12A, the mechanical shifting mechanism includes an adjustment screw 270a, a barrel 270b and a locking nut 270c. The adjustment screw is in threaded engagement with the barrel, which is fixedly attached to the raceway. By rotating the adjustment screw within the barrel, the barrel is moved relative to the adjustment screw, and thus the raceway is moved relative to the adjustment screw. The locking nut is also in threaded engagement with the adjustment screw, and when the raceway is correctly positioned through rotation of the adjustment screw, the locking nut is rotated into position to secure the adjustment screw.

Figure 12C:
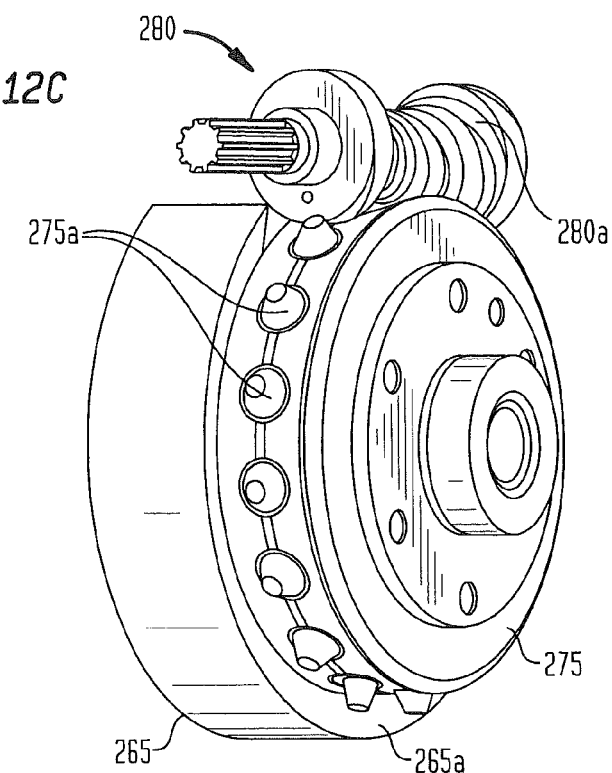
FIGS. 12C-12F illustrate how the shifting mechanism of FIG. 12A functions.
Figure 12D:
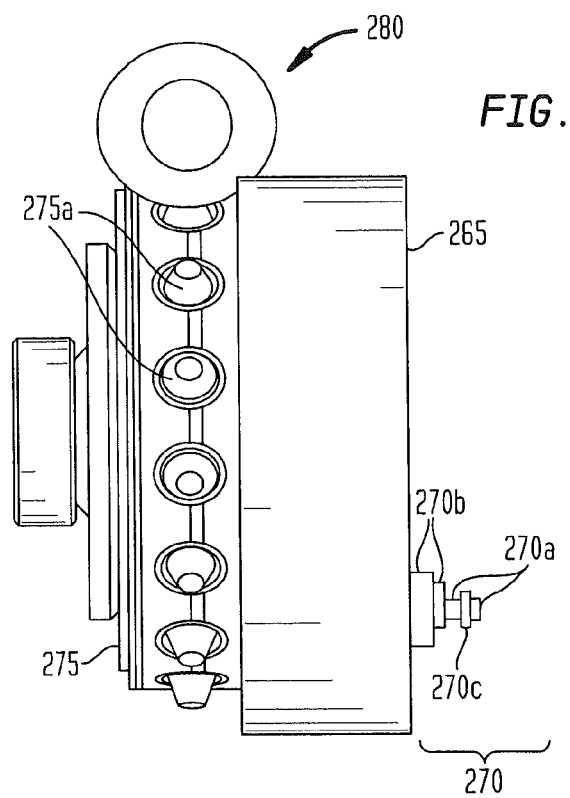
Figure 12E:
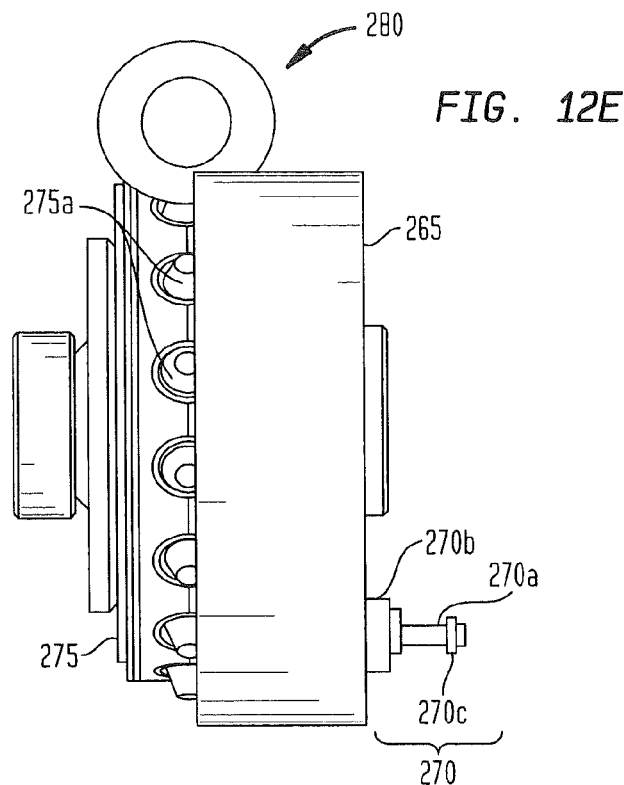
Figure 12F:
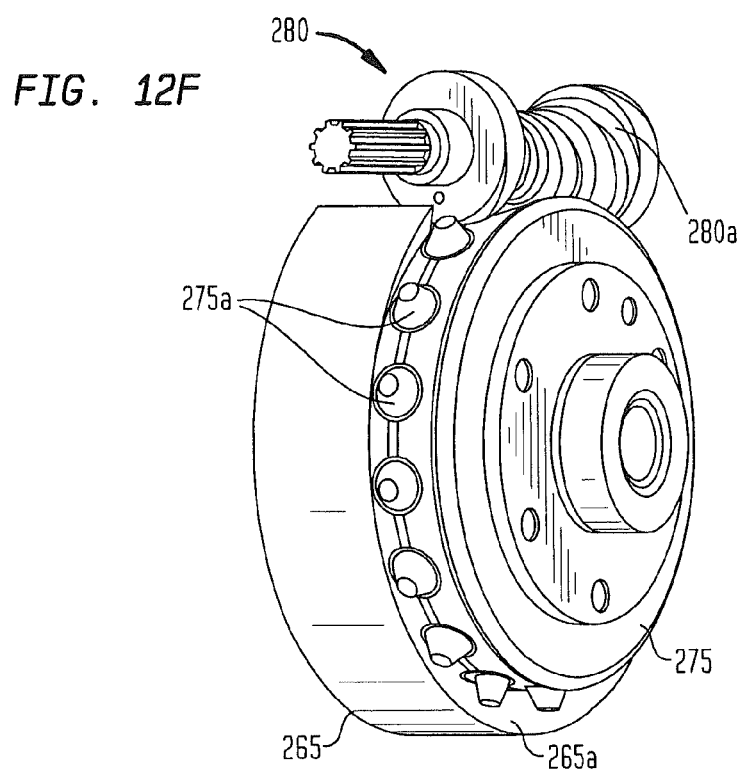

FIGS. 12C-12F illustrate how the shifting mechanism of FIG. 12A functions. FIGS. 12C-12F show a gear system including the raceway 265, the mechanical shifting mechanism 270, a worm wheel 275 and a worm screw 280. The raceway includes a raceway bearing surface 265a. The worm wheel includes a multiple of rotatable pins 275a. The worm screw includes a spiral groove 280a. FIGS. 12C And 12D show the worm wheel positioned such that the rotatable pins are not in contact with the raceway bearing surface. Accordingly, FIG. 12D shows that the adjustment screw of the shifting mechanism has been rotated within the mechanism's barrel so as to move the raceway away from the worm wheel. FIGS. 12E And 12F show the worm wheel positioned such that the rotatable pins are in contact with the raceway bearing surface. Accordingly, FIG. 12E shows that the adjustment screw of the shifting mechanism has been rotated within the mechanism's barrel so as to move the raceway toward the worm wheel.

In the illustrative shifting mechanism of FIGS. 12A-12F, as an alternative to manual rotation of the adjustment screw the screw can be rotated by a hydraulic motor or actuator, or by an electric motor. In such a configuration, the locking nut could be replaced by a hydraulic braking mechanism or a fixed stop that is attached to the raceway or that is part of the raceway.

Figure 13:
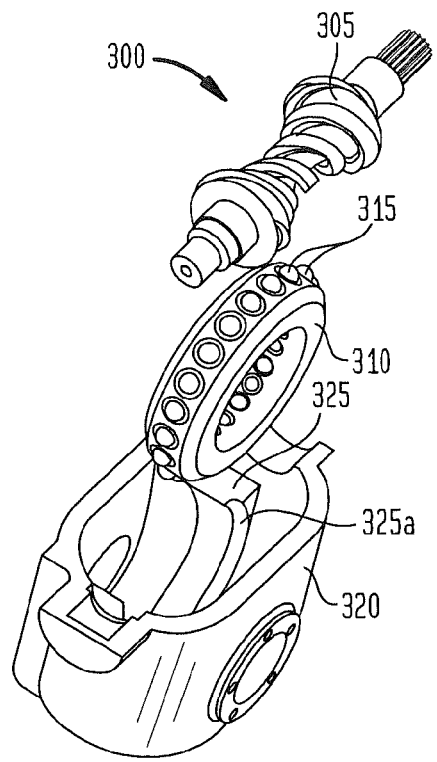
FIG. 13 is an exploded view of a gear system in accordance with a fourth embodiment of the present invention.

FIG. 13 is an exploded view of a gear system in accordance with a fourth embodiment of the present invention. The system includes a worm screw 300 having a spiral groove 305, a worm wheel 310 including rotatable pins 315, and a pin raceway 325 having a raceway bearing surface 325a. The components are secured within a housing 320. The housing is a one-piece housing. Raceway 325 is formed within the housing's inner surface and is an integral part of the housing.

FIG. 14 is an isometric cross-sectional view of the gear system depicted in FIG. 13.

Figure 15A:
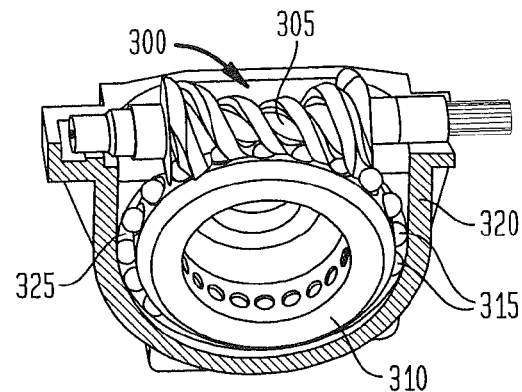
FIG. 15A is a cut-away view of the gear system of FIG. 13 with a portion removed for purposes of illustration.

FIG. 15A is a cut-away view of the gear system of FIG. 13 with a portion removed for purposes of illustration.

Figure 15B:
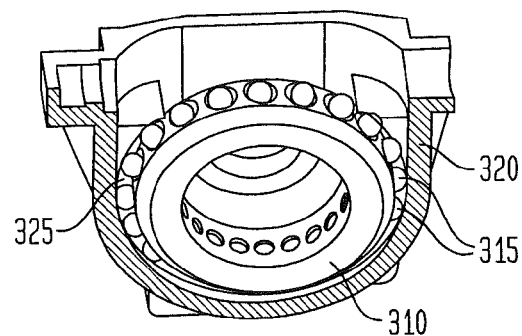
FIG. 15B is a cut-away view of a portion of the elements of FIG. 15A.

FIG. 15B is a cut-away view of a portion of the elements of FIG. 15A.

Figure 15C:
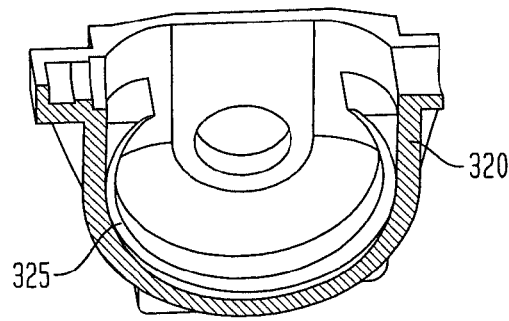
FIG. 15C is a cut-away view of a portion of the elements of FIG. 15B.

FIG. 15C is a cut-away view of a portion of the elements of FIG. 15B.

It should be noted that the FIG. 13 embodiment is not limited to a raceway or raceways that are an integral part of the housing. One or more raceways may be secured to or attached to the housing, rather than being an integral part of the housing. In view of this disclosure, one skilled in the art of the invention will readily appreciate a wide range of manufacturing processes of a raceway or raceways that are secured to or attached to the housing.

It should be further noted that the gear system housing of the FIG. 13 embodiment is preferably formed from a relatively hard, durable, and commercially available material, such as hardened steel, stainless steel or a metal composite.

It should be still further noted that the housing of the FIG. 13 embodiment is not limited to a one-piece housing. For example, the housing may be made up of two or more pieces.

Figure 16:
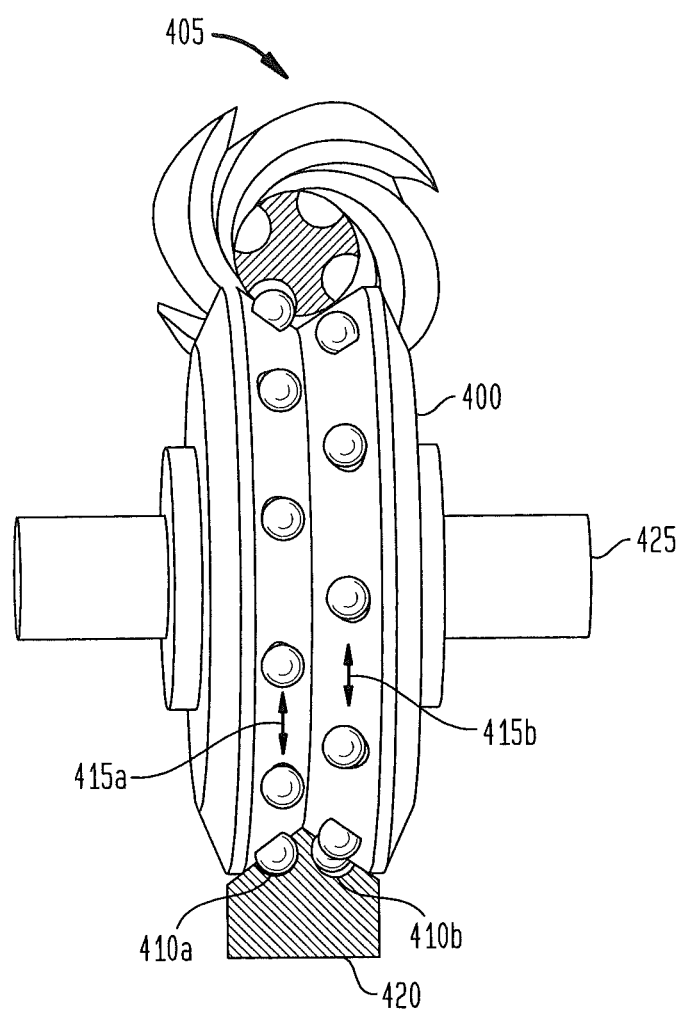
FIG. 16 shows a fifth embodiment of a gear system in accordance with the invention.

FIG. 16 shows a fifth embodiment of a gear system in accordance with the invention. The FIG. 16 embodiment includes a worm wheel 400, a worm screw 405, and two pin raceways 410a and 410b. The worm wheel has two sets of rotatable pins arranged in respective rows 415a and 415b, and the worm screw has a spiral groove 405a cut into its surface for the purpose of engaging the pins. The raceways are formed on the inner surface of a housing 420 and engage those pins that are not engaged by the worm screw. Only a portion of the housing is shown in cross-section for purposes of clarity of presentation. The gear system of FIG. 16 is used to drive an axel 425. The operation of the gear system of FIG. 16 is readily appreciated in view of the detailed description of FIGS. 1-15.

It should be noted that the embodiment of FIG. 16 is merely illustrative of a multiple-raceway/multiple-pin-row embodiment of the invention, and that a worm wheel of the invention could have more than two raceways and/or more than two rows of pins.

Moreover, the rotatable pins of the present invention are not limited to any one geometry. To illustrate two examples of alternative pin geometries, FIGS. 17 and 18 are provided.

Figure 17:
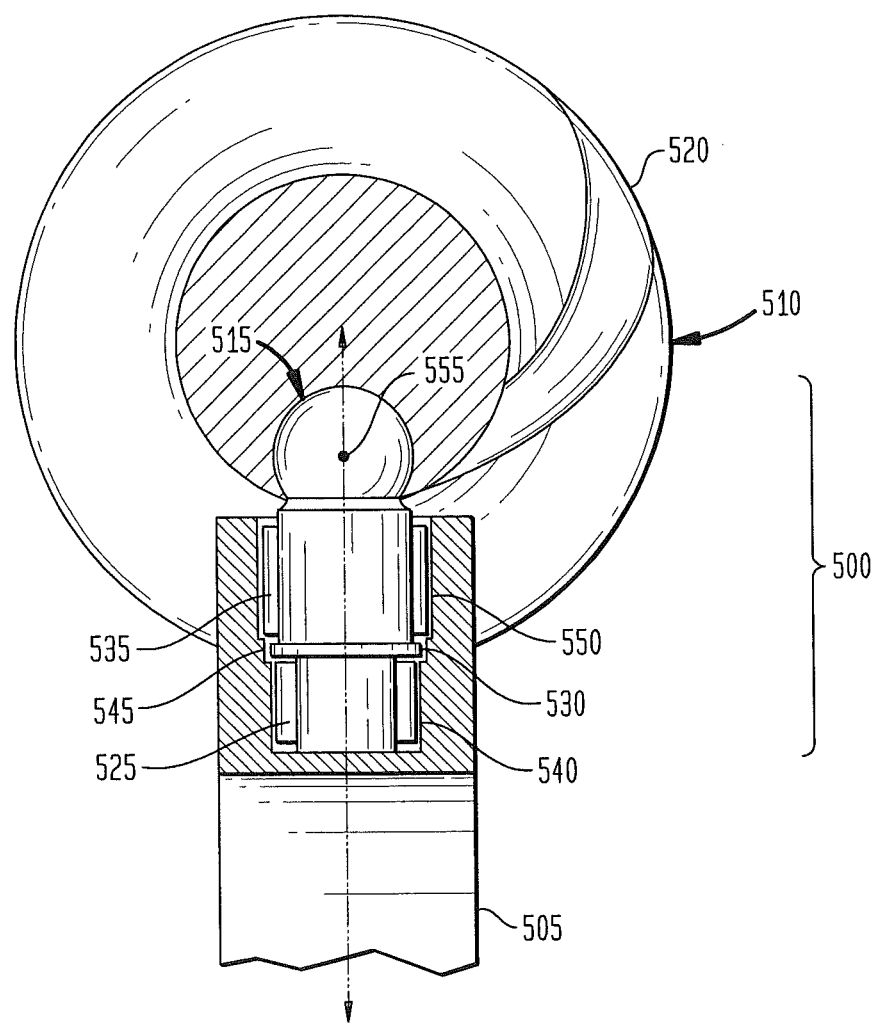
FIG. 17 shows a first alternative embodiment of a pin in accordance with the invention.

FIG. 17 shows a first alternative embodiment of a pin in accordance with the invention. The drawing shows a pin 500 positioned in a worm wheel 505 and engaging a worm screw 510. The pin has a head 515 in the shape of a truncated sphere. The head of the pin engages a groove 520 in the worm screw. The pin is supported in wheel 505 by a first bearing 525, a flange 530 and a second bearing 535. The bearings and flange are seated in a bore within the wheel, the bore including three sections, a lower section 540, a middle section 545, and an upper section 550. The longitudinal axis of the pin is indicated by line 555.

Figure 18:
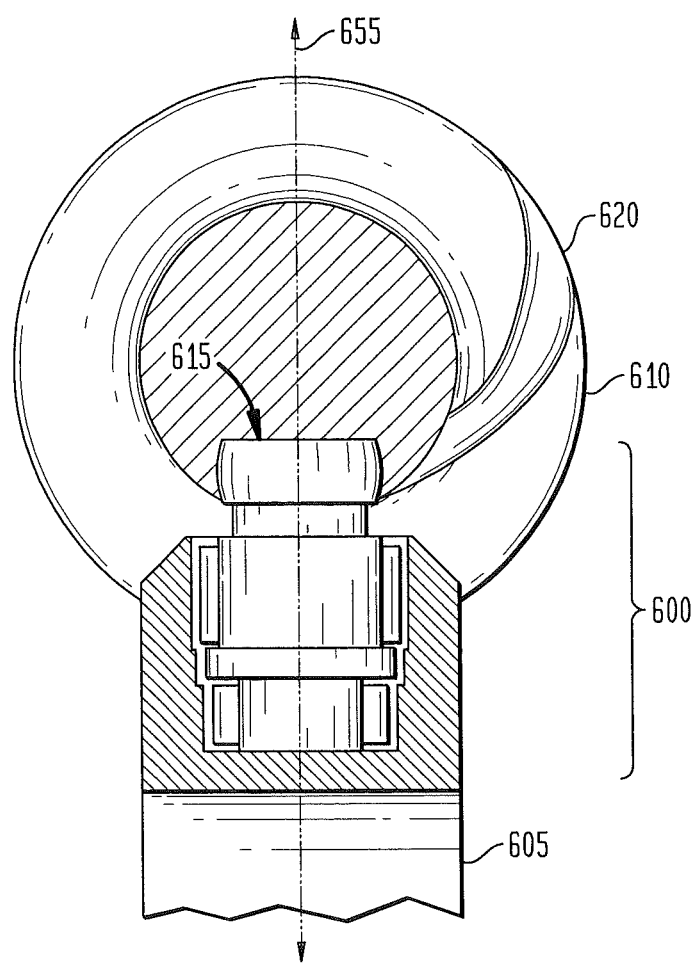
FIG. 18 shows a second alternative embodiment of a pin in accordance with the invention.

FIG. 18 shows a second alternative embodiment of a pin in accordance with the invention. The figure shows a pin 600 positioned in a wheel 605 and engaging a worm screw 610. The pin has a head 615 in the shape of a double-truncated sphere. The head of the pin engages a groove 620 in the worm screw. The longitudinal axis of the pin is indicated by line 655.

For each type of pin that may be employed, the corresponding worm screw groove(s) and raceway bearing surface(s) have a mating shape. For example, the pin of FIG. 17 would "mate with" and "roll along" a concave worm screw groove, and would "mate with" and "roll along" a concave raceway bearing surface.

As these and other variations and combinations of the features discussed above can be utilized without departing from the present invention as defined by the claims, the foregoing description of the preferred embodiments should be taken by way of illustration rather than by way of limitation of the invention as defined by the claims.

The invention claimed is:

1. A worm-gear assembly, comprising:
   a worm screw having at least one groove;
   a wheel having a plurality of rotatable pins along its periphery for engaging the worm screw, the pins being able to rotate in a direction other than a direction of wheel rotation; and
   two raceways positioned at opposite sides of the worm wheel and being operable to respectively engage opposing sides of a number of the pins that are not engaged with the worm screw during operation of the assembly, each raceway not engaging any pin that is engaged with the worm screw.

2. The worm-gear assembly as recited in claim 1, wherein one of the raceways is movable.

3. The worm-gear assembly as recited in claim 2, further comprising a shifting mechanism for moving the movable raceway.

4. The worm-gear assembly as recited in claim 2, wherein the movable raceway is movable to at least one position in which the movable raceway engages a number of the pins that are not engaged with the worm screw during operation of the assembly, and is movable to at least one other position in which the movable raceway does not engage the pins.

5. The worm-gear assembly as recited in claim 1, wherein both of the raceways are movable.

6. The worm-gear assembly as recited in claim 5, further comprising a shifting mechanism for moving the raceways.

7. The worm-gear assembly as recited in claim 5, wherein each of the raceways is movable to at least one position in which the raceway engages a number of the pins that are not engaged with the worm screw during operation of the assembly, and is movable to at least one other position in which the raceway does not engage the pins.

8. A worm-gear assembly, comprising:
   a worm screw having at least one groove;
   a wheel having a plurality of rotatable pins along its periphery for engaging the worm screw, the pins being able to rotate in a direction other than a direction of wheel rotation;
   two raceways positioned at opposite sides of the worm wheel and being operable to respectively engage opposing sides of a number of the pins that are not engaged with the worm screw during operation of the assembly, wherein one of the raceways is movable; and
   a shifting mechanism for moving the movable raceway,
   wherein the movable raceway is movable to at least one position in which the movable raceway engages a number of the pins that are not engaged with the worm screw during operation of the assembly, and is movable to at least one other position in which the movable raceway does not engage the pins.

9. A worm-gear assembly, comprising:
   a worm screw having at least one groove;
   a wheel having a plurality of rotatable pins along its periphery for engaging the worm screw, the pins being able to rotate in a direction other than a direction of wheel rotation; and
   two raceways positioned at opposite sides of the worm wheel and being operable to respectively engage opposing sides of a number of the pins that are not engaged with the worm screw during operation of the assembly, wherein both of the raceways are movable.

10. The worm-gear assembly as recited in claim 9, further comprising a shifting mechanism for moving the raceways.

11. The worm-gear assembly as recited in claim 9, wherein each of the raceways is movable to at least one position in which the raceway engages a number of the pins that are not engaged with the worm screw during operation of the assembly, and is movable to at least one other position in which the raceway does not engage the pins.

* * * * *